United States Patent

Boatwright

[15] 3,691,473
[45] Sept. 12, 1972

[54] VOLTAGE RATIO APPARATUS WITH LOGARITHMIC OUTPUT

[72] Inventor: John T. Boatwright, Hopkinton, N.H.

[73] Assignee: Northeast Electronics Corporation, Concord, N.H.

[22] Filed: Aug. 19, 1968

[21] Appl. No.: 753,520

[52] U.S. Cl. ............... 328/145, 307/229, 328/161, 235/196
[51] Int. Cl. ............................................. G06g 7/24
[58] Field of Search ............. 328/145, 161; 329/106; 307/229; 235/196

[56] References Cited

UNITED STATES PATENTS

| 3,255,417 | 6/1966 | Gottlieb | 328/145 |
| 3,333,262 | 7/1967 | Orsen | 307/235 |
| 3,423,580 | 1/1969 | Nance | 307/229 |
| 2,763,838 | 9/1956 | McConnell | 235/196 |

*Primary Examiner*—James W. Lawrence
*Assistant Examiner*—Harold A. Dixon
*Attorney*—Ward, McElhannon, Brooks & Fitzpatrick

[57] ABSTRACT

Both an input voltage signal and an adjustable reference voltage signal are compared with an exponential wave for providing, through a logic circuit, an output pulse whose width is proportional to the logarithm, either to the base 10 or to the natural base, of the ratio of the input signal to the reference signal. The output pulse controls a gate supplied with clock pulses for providing a digital output.

9 Claims, 6 Drawing Figures

PATENTED SEP 12 1972

INVENTOR.
JOHN T. BOATWRIGHT
BY
Ward, McElhannon, Brooks & Fitzpatrick
ATTORNEYS

VOLTAGE RATIO APPARATUS WITH LOGARITHMIC OUTPUT

The present invention relates to apparatus for providing an output signal having a parameter proportional to the logarithm of the ratio of an input voltage signal to a reference voltage signal.

A convenient unit in electric measurements is the decibel (abbreviated db) which is proportional to the logarithm to the base 10 of the ratio of the quantity being measured to some given reference value. The neper is a similar unit proportional to the natural logarithm of the above mentioned ratio. It is, therefore, a purpose of the present invention to provide apparatus for use in providing measurements in db or neper units.

For various reasons, it is often desirable to provide a direct digital display of the measurements. Therefore, a further purpose of the present invention is to provide an arrangement for converting a voltage input signal to a pulse width modulated signal, the width of which is proportional to the logarithm of such input signal. The pulse width modulated signal can then be used to control the passage of counting or clock pulses through a gate circuit for operating a digital display device. However, since the decibel or neper is a measurement of a ratio, the absolute magnitude thereof increases on either side of the given zero point. Hence, to eliminate ambiguity, it is necessary to know the sign of the measurement, that is, whether the signal being measured is greater or less than the selected reference or zero value. Thus, it is another object of the present invention to provide a circuit for measuring the variation in an input signal in terms of db or neper units relative to an adjustable reference level with complete freedom from ambiguity.

In accordance with one aspect of the invention, there is provided apparatus for providing an output signal having a parameter proportional to the logarithm of the ratio of an input voltage signal to a reference voltage signal comprising in combination: a source of exponentially varying voltage; first means for comparing the voltage from the source with the input voltage signal to provide a first signal manifestation at the instant in time when the absolute values of the last two voltages are equal; second means for comparing the voltage from the source with the reference voltage signal to provide a second signal manifestation at the instant in time when the absolute values of the last two voltages are equal; and means coupled to the first and second means and responsive to the first and second signal manifestations for providing an output signal having a parameter proportional to the time interval between the occurrence of the two signal manifestations.

In accordance with a further aspect of the invention, there is provided means coupled to the first and second means responsive to the signals therefrom for providing a signal indicative of the sign of the input voltage signal relative to the reference voltage signal.

The invention will be better understood after reading the following detailed description of a presently preferred embodiment thereof with reference to the accompanying drawings in which.

Figure 1:
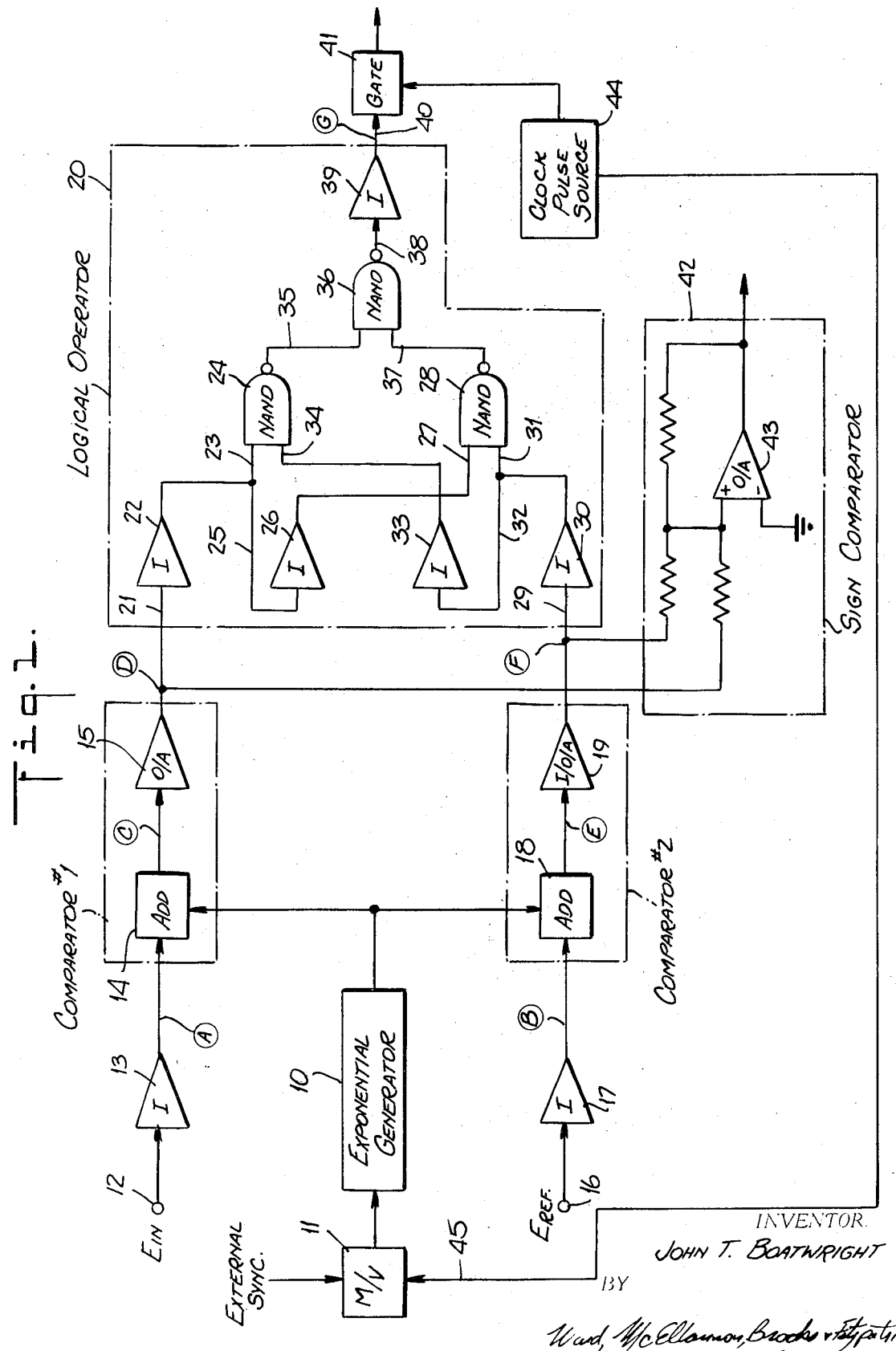
FIG. 1 is a block diagram of the apparatus.
Figure 2:
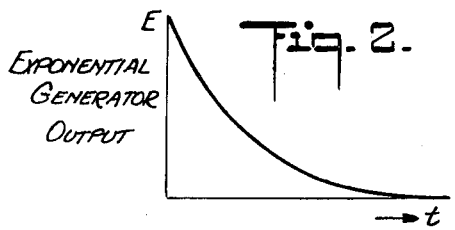
FIG. 2 is a wave-shape diagram showing the output from the exponential generator of FIG. 1.

Referring now to FIG. 1, an exponential voltage of the form shown in FIG. 2 is provided by an exponential generator 10. The operation of the exponential generator 10 is controlled by a multivibrator or similar timing circuit 11. In known manner, the exponential generator is arranged to provide an exponential output each time an enabling pulse is received from the multivibrator 11. The input voltage designated as $E_{in}$ is fed to the instrument through a terminal 12 to a polarity inverting amplifier 13. For the purpose of this discussion, it is assumed that the input signal voltage has a positive polarity. Thus, the signal at the output of the amplifier 13 will be of negative polarity. By way of example, the input signal may have the value of $E_1$ shown in FIG. 3 and the signal at the point (A) at the output of amplifier 13 will be as illustrated on line (A) of FIG. 4.

The signal from amplifier 13 is fed to an adding circuit or network 14 within a first comparator circuit designated as Comparator #1. Also supplied to the adding circuit 14 is the exponential signal from generator 10. The adding circuit 14 performs algebraic addition on the two signals fed thereto. The output will be somewhat as shown on line (C) of FIG. 4, for the example now being considered. The effect has been to shift the datum or zero point of the exponential wave.

The shifted wave at the output of the adding circuit 14 is fed to an operational amplifier (abbreviated O/A) 15. As is well known, the operational amplifier is a device having an extremely high gain capable of changing its output from one extreme to another in response to a slight change in input signal. In the present case, it may be assumed that the output of the operational amplifier 15 is at its maximum positive value so long as the signal at its input is positive or above the datum level. As soon as the input signal drops below the zero or datum level the output of the amplifier will drop to zero or a negative value depending upon the specific operating parameters.

Another way of looking at the circuit is that the output of the operational amplifier 15 is at a logical 1 value when its input signal is positive and is at a logical 0 value when its input signal is negative. Therefore, the signal at the point in the circuit designated (D) will be as shown on line (D) of FIG. 4. Referring to the wave-shape on line (D) of FIG. 4, it will be seen that the vertical trailing edge of the positive pulse or the point of transition from the logical 1 to the logical 0 value coincides with the point in time when the input signal on line (C) crosses the zero axis.

In order to establish the necessary reference level for the apparatus a selectable reference voltage signal $E_{ref.}$ is fed to a terminal 16 from which it is fed to the input of a inverting amplifier 17. If the reference signal has a relative value as shown on FIG. 3 then the signal at point (B) in FIG. 1 will be as shown on line (B) of FIG. 4.

The output from the amplifier 17 is fed to one input of an adding circuit or network 18, the other input of which is connected to receive the exponential wave from the exponential generator 10. The adding network 18 is part of a second comparator circuit designated on the drawing as Comparator #2. The adding network 18 functions in a manner similar to adding network 14 to shift the datum or zero point of the exponential wave an amount equal to the magnitude of the reference voltage. Thus, the output from the adding circuit 18 will be as shown on line (E) of FIG. 4.

The output from the adding circuit 18 is fed to an input of another operational amplifier 19. For a purpose that will appear hereinafter, the signal input to operational amplifier 19 is supplied to an inverting input thereof so that the output of the operational amplifier 19 is reversed in polarity relative to its input. Thus, the output of amplifier 19, shown on line (F) of FIG. 4, corresponds to a logical 0 when its input signal is positive and shifts to a logical 1 value when its input signal goes negative. As seen in line (F) of FIG. 4, the leading edge or change in logical value of amplifier 19 coincides in time with the point at which the input signal represented by the wave-shape on line (E) passes through the zero point.

Figure 4:
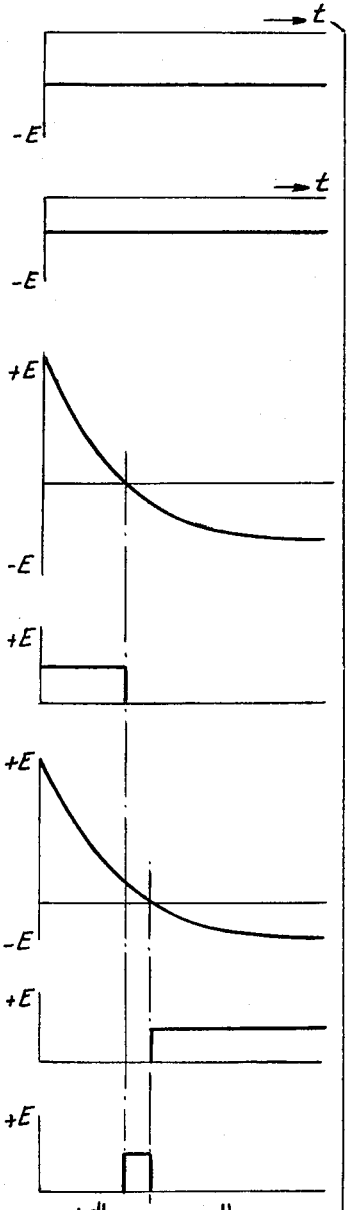
FIG. 4 is a series of wave-shape diagrams showing the conditions at various circuit points in the circuit of FIG. 1 for the first signal voltage shown in FIG. 3.

It will be observed by comparing the wave-shapes in FIG. 4 that the shift in the output of amplifier 19 occurs later in time than the shift in the output of amplifier 15. It should now be apparent that the magnitude of the time difference between the change in output of the two operational amplifiers 15 and 19 represents the desired measurement. In order to convert the signals at the output of the Comparators #1 and #2 to a pulse having a width equal to the time interval between the change in conditions at the output of each comparator, the signals therefrom are applied to the logical operator shown within the outlined box 20.

The output from the amplifier 15 is fed over a connection 21 to the input of an inverting amplifier 22 from whose output it is fed to a first input 23 of a NAND circuit 24. The output from amplifier 22 is also fed over a connection 25 to an input of another inverting amplifier 26 whose output is fed to a first input 27 of a second NAND circuit 28. In similar manner, the signal from the operational amplifier 19 is fed over connection 29 to the input of an inverting amplifier 30 from whose output it is fed to the second input 31 of the NAND circuit 28 and over connection 32 to an inverting amplifier 33 whose output is connected to the second input 34 of the NAND circuit 24. The NAND circuit 24 has its output connected to an input 35 of another NAND circuit 36 whose second input 37 is fed from the output of NAND circuit 28. The output from NAND circuit 36 passes over a connection 38 to an inverting amplifier 39 whose output is connected over a connection 40 to the input of a gate circuit 41. The output connection 40 represents the output from the logical operator 20.

The operation of the logical operator circuit 20 will now be explained with aid of the chart set out below. Each column in the chart represents the logical condition of the point in the circuit of FIG. 1 corresponding to the reference numeral at the head of the column.

Each horizontal line in the chart represents conditions existing simultaneously in the circuit. It should be understood that each of the NAND circuits is arranged to provide a logical 0 output only when both inputs have the logical 1 value. Under all other input conditions the output of each of the NAND circuits is in the logical 1 condition. Referring to the chart, it can now be seen that the output from the logical operator has the logical 1 value only when both inputs to the logical operator have the same logical value. Line (G) in FIG. 4 shows the output pulse appearing on connection 40 at the output of the logical operator.

CHART

|     | 21 | 29 | 23 | 34 | 27 | 31 | 35 | 37 | 38 | 40 |
|-----|----|----|----|----|----|----|----|----|----|----|
| (a) | 1  | 0  | 0  | 0  | 1  | 1  | 1  | 0  | 1  | 0  |
| (b) | 0  | 0  | 1  | 0  | 0  | 1  | 1  | 1  | 0  | 1  |
| (c) | 0  | 1  | 1  | 1  | 0  | 0  | 0  | 1  | 1  | 0  |
| (d) | 1  | 1  | 0  | 1  | 1  | 0  | 1  | 1  | 0  | 1  |

Figure 3:
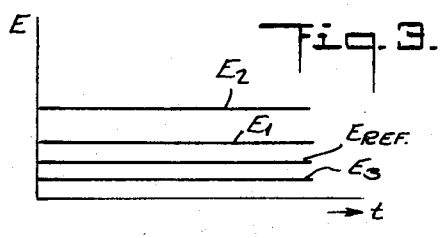
FIG. 3 is a wave-shape diagram showing the relationship of typical input voltage signals to a selected reference voltage signal.
Figure 5:
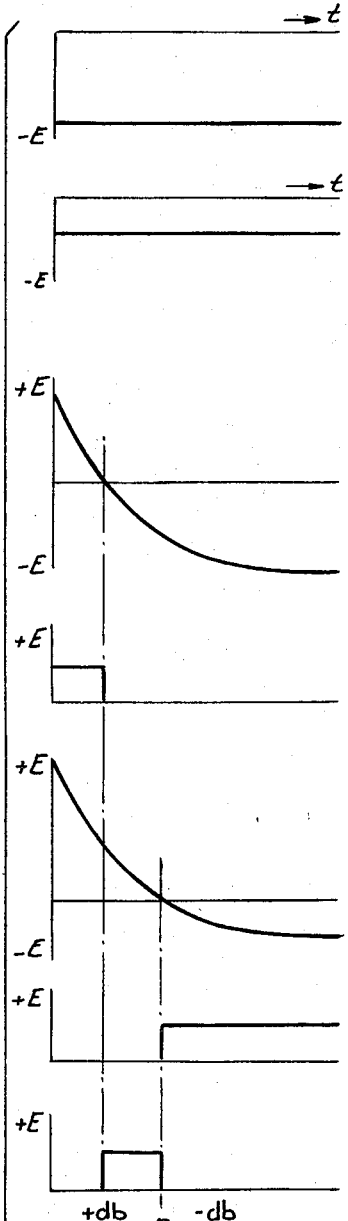
FIG. 5 is a series of wave-shape diagrams showing the condition of the circuit of FIG. 1 for the second input signal voltage of FIG. 3.
Figure 6:
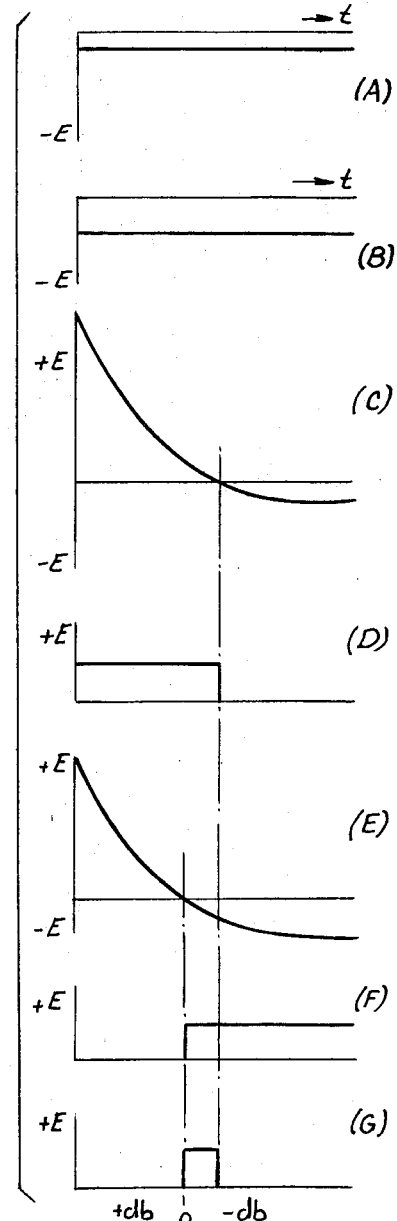
FIG. 6 shows the conditions of the circuit of FIG. 1 for the third input signal voltage of FIG. 3.

FIGS. 5 and 6 show the condition of the circuit, respectively, for input voltages $E_2$ and $E_3$ of FIG. 3. From FIG. 5, it is seen that the width of the pulse at the output of the logical operator becomes greater as the input signal becomes more positive relative to the reference signal. FIG. 6 shows the case when the input signal falls below the reference signal. It will be understood that the width of the pulse at the output of the logical operator approaches zero as the input signal approaches the reference signal magnitude. It is necessary, therefore, to provide some means for indicating the relative sign of the input signal. This is provided by the sign comparator circuit shown in the outline box 42 of FIG. 1.

The circuit illustrated in box 42 is essentially a summing amplifier employing an operational amplifier 43 with a resistive positive feedback circuit and two resistive input circuits coupled, respectively, to the outputs from operational amplifiers 15 and 19. The output from the sign comparator 42 will be at one extreme level when the inputs thereto have the logical 1 value and in an opposite extreme level when both inputs are of logical 0 value. When the two inputs have opposite logical values the output from the sign comparator will remain at the previously set level due to the resistive positive feedback. By utilizing the output from the sign comparator to control the selector circuit, it is possible to ignore the changes in condition at its input at those periods during a cycle of operation of the device other than when the gate 41 is in the open or conductive state.

In order to operate a digital display the gate 41 is supplied with counting or clock pulses from a source 44, as shown. It will be understood that the number of pulses passing through the gate will be proportional to the width of the controlling gate signal as represented on line (G) of FIGS. 4, 5 and 6. In order to avoid phasing error due to shift in relative time or phase between the output from the exponential generator and the timing of the pulses from the source 44, an output from the source can be fed back over a connection 45 to synchronize the multivibrator 11. If desired, the multivibrator can also be provided with means for supplying an external synchronization signal thereto.

It should be understood that if the input signal voltage and/or the reference signal voltage are of opposite polarity, the inverting amplifiers 13 and/or 17 may be omitted. It will also be apparent to those skilled in the art that various other changes may be made in the circuit described herein without departing from the true spirit of the invention as defined in the appended claims.

What is claimed is:

1. Apparatus for providing an output signal having a parameter proportional to the logarithm of the ratio of an input voltage signal to a reference voltage signal comprising in combination: a source of exponentially varying voltage; first means for comparing the voltage from said source with said input voltage signal to provide a first signal manifestation at the instant in time when the absolute values of the last two voltages are equal; second means for comparing the voltage from said source with said reference voltage signal to provide a second signal manifestation at the instant in time when the absolute values of the last two voltages are equal; and means coupled to said first and second means and responsive to said first and second signal manifestations for providing an output signal having a parameter proportional to the time interval between the occurrence of said two signal manifestations, said first means comprising a first very high gain amplifier circuit whose voltage output is alterable between two extreme limits in response to variation in its input signal above and below a given datum, and means for adding a voltage from said source having positive polarity relative to said datum to an input voltage signal of negative polarity relative to said datum and feeding the sum voltage to said first amplifier circuit to change the output voltage of said first amplifier circuit from one of said limits to the other when said sum voltage passes through said datum; and said second means comprising a second very high gain amplifier circuit whose voltage output is alterable between two extreme limits in response to variation in its input signal above and below a given datum, and means for adding a voltage from said source having positive polarity relative to said datum to a reference voltage signal of negative polarity relative to said datum and feeding the sum voltage to said second amplifier circuit to change the output voltage of said second amplifier circuit from one of said limits to the other when said sum voltage passes through said datum.

2. Apparatus according to claim 1, wherein said first and second amplifier circuits each consist of an operational amplifier with one operational amplifier providing an output of the same polarity as its input and the other operational amplifier providing an output of inverted polarity relative to its input.

3. Apparatus for providing an output signal having a parameter proportional to the logarithm of the ratio of an input voltage signal to a reference voltage signal comprising in combination: a source of exponentially varying voltage; first means for comparing the voltage from said source with said input voltage signal to provide a first signal manifestation at the instant in time when the absolute values of the last two voltages are equal; second means for comparing the voltage from said source with said reference voltage signal to provide a second signal manifestation at the instant in time when the absolute values of the last two voltages are equal; and means coupled to said first and second means and responsive to said first and second signal manifestations for providing an output signal having a parameter proportional to the time interval between the occurrence of said two signal manifestations, said first signal manifestation being represented by a change in signal from said first means from a representation of a logical 1 to a logical 0, and said second signal manifestation being represented by a change in signal from said second means from a representation of a logical 0 to a logical 1; and said means for providing an output signal comprising a logical operator circuit for providing a logical 1 output signal only when said signals from said first and second means represent simultaneously the same logical condition and otherwise providing a logical 0 output signal.

4. Apparatus according to claim 3, wherein a summing amplifier circuit is provided having its input coupled to said first and second means responsive to said signals therefrom for providing a signal indicative of the sign of said input voltage signal relative to said reference voltage signal.

5. Apparatus for providing an output signal having a parameter proportional to the logarithm of the ratio of an input voltage signal to a reference voltage signal comprising in combination: a source of exponentially varying voltage; first means for comparing the voltage from said source with said input voltage signal to provide a first signal manifestation at the instant in time when the absolute values of the last two voltages are equal; second means for comparing the voltage from said source with said reference voltage signal to provide a second signal manifestation at the instant in time when the absolute values of the last two voltages are equal; and means coupled to said first and second means and responsive to said first and second signal manifestations for providing an output signal having a parameter proportional to the time interval between the occurrence of said two signal manifestations, and means coupled to said first and second means responsive to the signals therefrom for providing a signal indicative of the sign of said input voltage signal relative to said reference voltage signal.

6. Apparatus for providing an output signal having a parameter proportional to the logarithm of the ratio of an input voltage signal to a reference voltage signal comprising in combination: a source of exponentially varying voltage; keying means coupled to said source for determining the initiation of each exponential voltage wave produced by said source; first means for comparing the voltage from said source with said input voltage signal to provide a first signal manifestation at the instant in time when the absolute values of the last two voltages are equal; second means for comparing the voltage from said source with said reference voltage signal to provide a second signal manifestation at the instant in time when the absolute values of the last two voltages are equal; means coupled to said first and second means and responsive to said first and second signal manifestations for providing a gating pulse signal having a duration proportional to the time interval between the occurrence of said two signal manifestations; means for providing pulses of relatively short duration with substantially constant periodicity; a gating circuit coupled to both said last mentioned means and to said means for providing a gating pulse signal for passing a train of said pulses in the presence of said gating pulse signal, the number of pulses in said train representing said parameter; and means coupling the pulses from said pulse providing means to said keying means for synchronizing the operation of the latter.

7. Apparatus according to claim 6, wherein said first signal manifestation is represented by a change in signal from said first means from a representation of a logical 1 to a logical 0, and said second signal manifestation is represented by a change in signal from said second means from a representation of a logical 0 to a logical 1; and wherein said means for providing a gating pulse signal comprises a logical operator circuit for providing a logical 1 output signal representing said gating pulse when said signals from said first and second means represent simultaneously the same logical condition, and at all other times providing a logical 0 output signal.

8. Apparatus according to claim 7, wherein a summing amplifier circuit is provided having its input coupled to said first and second means responsive to said signals therefrom for providing a signal indicative of the sign of said input voltage signal relative to said reference voltage signal.

9. Apparatus according to claim 6, wherein means are provided coupled to said first and second means responsive to the signals therefrom for providing a signal indicative of the sign of said input voltage signal relative to said reference voltage signal.

* * * * *